C. A. Buttles,
Improved Stove-pipe Thimble.
Fig. 1. REISSUED JUN 27 1871
4438
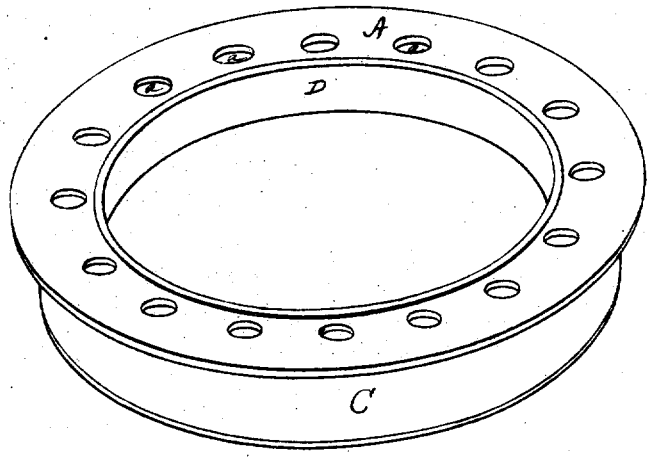
Fig. 3.
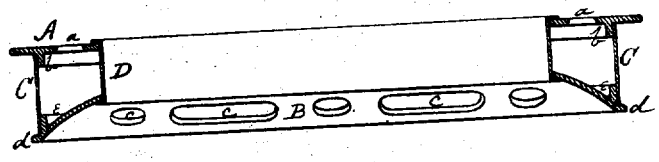
Fig. 2.
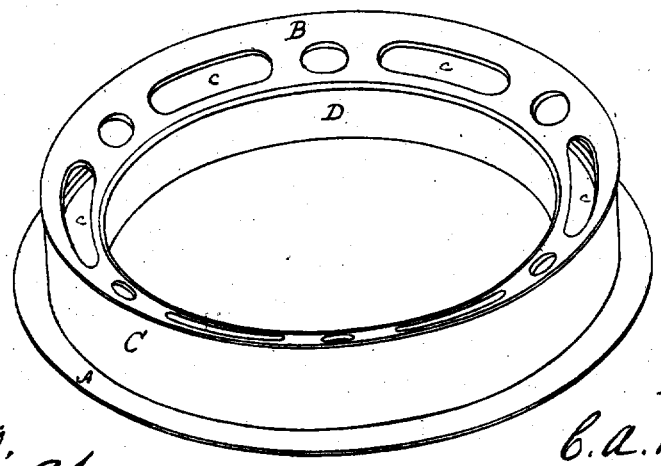
Witnesses.
A. Rawlings
Nathan'l Ho. Ellsworth.
Inventor.
C. A. Buttles
By Hill & Ellsworth
Attys.
AM. PHOTO-LITHOGRAPHIC CO. N.Y. (OSBORNE'S PROCESS)

UNITED STATES PATENT OFFICE.

C. A. BUTTLES, OF MILWAUKEE, WISCONSIN.

IMPROVEMENT IN STOVE-PIPE THIMBLES.

Specification forming part of Letters Patent No. 95,649, dated October 12, 1869; reissue No. 4,438, dated June 27, 1871.

*To all whom it may concern:*

Be it known that I, C. A. BUTTLES, of the city and county of Milwaukee, in the State of Wisconsin, have invented an Improved Stove-Pipe Thimble; and I do hereby declare the following to be a full, clear, and exact description of the same, reference being had to the accompanying drawing forming part of this specification, in which—

Figure 1 represents a perspective view, showing the top of the thimble; Fig. 2, a similar view, showing the bottom; and Fig. 3, a transverse vertical section.

Similar letters of reference in the drawing denote corresponding parts.

This invention relates to that class of stove-pipe thimbles which is constructed with a perforated annular upper head, and a similar under head, connected by two concentric bands of sheet metal, the outer one bearing against flanges cast or formed upon the heads, and the inner one bent over the inner edges of the heads.

As heretofore constructed, the two heads, whether made of cast or sheet metal, have been made flat and parallel to each other, with holes in the upper head as large as those in the lower one, whereby they are rendered defective in several particulars, as follows, viz.: First, the holes in the lower head being no larger than those in the upper, the dirt falling through the upper head is apt to lodge and accumulate inside of the thimble, and after awhile, being thoroughly dried and highly combustible, will occasionally become ignited by the heat from the pipe and endanger the building. Second, when such dirt accumulates inside of the thimble, there being nothing to deflect it away from the inner band which is in contact with the stove-pipe, the danger of conflagration is thereby rendered imminent. Third, the outer band, which fits between the heads, must be made shorter than the inner band, which laps over their edges; and as sheet-tin is manufactured and sold in strips of certain sizes—ten, twelve, fourteen, &c., inches in length—the tin must be cut to waste to make the bands fit: for example, in cutting ten-inch tin for a six-inch thimble, it would cut into strips of about six and four inches, respectively, of which only the former could be used; and in cutting twelve-inch tin for the same purpose two strips of six inches each would be produced, one of which would be of the right size, while the other would have to be trimmed and a part of the metal wasted.

My invention is designed to remedy these defects of the old-fashioned thimbles; and to this end it consists: First, in making the holes of the lower head larger than those of the upper, whereby the dirt that falls through between them can readily escape; second, in making the lower head conical, with its surface inclining downward away from the inner band, so that any dirt falling through upon it will be inclined to roll or slide away from the vicinity of the stove-pipe and drop through the large elongated holes or lodge at the outer edge of the inclosed space, where it will not catch fire from the pipe; and third, in constructing the two heads in such form that the distance between their inner edges is less than the distance between their outer edges: in other words, in contracting the distance between their inner edges so that sheet-metal bands of equal length will fit perfectly, although the outer one comes between the heads and the inner one laps over their edges.

In the drawing, A indicates the upper head, having a series of holes, *a a*, &c., through it, with a flange, *b*, upon it, said flange being for the purpose of catching the outer band C, of tin or other sheet metal. B is the lower head, constructed in a conical or flaring form, with flanges *e* for the purpose of supporting the band C, and with a series of holes or openings, *c c*, of much greater area, individually, than those of the upper head. The under head B has a diameter equal to the diametric proportions of the flange *b* on the upper head, so that the sheet-metal band C that catches upon the flange of the upper head may have its under edge turned over upon or abutted against a very slight projection, *d*, on the exterior edge of the under head, the latter plan being preferable and all sufficient, as this band needs only to keep the two heads apart, while the inner band D has its edges turned over the edges of both the upper and under heads to hold them together.

Having thus described my invention, what I claim as new therein, and desire to secure by Letters Patent, is—

1. In a stove-pipe thimble, consisting of two perforated annular heads connected by concentric hoops or bands, the employment of a conical lower head, substantially as and for purpose described.

2. A stove-pipe thimble consisting of two annular heads connected by concentric hoops or bands, when the upper head is provided with a series of small openings and the under head with a series of larger openings, substantially as and for the purposes herein set forth.

3. A stove-pipe thimble consisting of two perforated annular heads connected by two concentric hoops or bands, when so constructed that the bearings of the inner band are brought nearer together than those of the outer band, whereby the bands themselves can be cut of equal length, substantially as and for the purposes specified.

C. A. BUTTLES.

Witnesses:
F. S. BUTTLES,
R. H. LAY.